United States Patent
Khazanov et al.

(10) Patent No.: US 10,182,400 B2
(45) Date of Patent: Jan. 15, 2019

(54) LOW-POWER WAKE-UP MECHANISM FOR WIRELESS DEVICES

(71) Applicant: Robert Bosch GmbH, Stuttgart (DE)

(72) Inventors: Alex Khazanov, Rochester, NY (US); Othmane Bennis, Rochester, NY (US); Brian Vorees, Ithaca, NY (US)

(73) Assignee: Robert Bosch GmbH, Stuttgart (DE)

( * ) Notice: Subject to any disclaimer, the term of this patent is extended or adjusted under 35 U.S.C. 154(b) by 137 days.

(21) Appl. No.: 15/260,711

(22) Filed: Sep. 9, 2016

(65) Prior Publication Data

US 2017/0070959 A1  Mar. 9, 2017

Related U.S. Application Data

(60) Provisional application No. 62/215,813, filed on Sep. 9, 2015.

(51) Int. Cl.
*H04W 52/02* (2009.01)

(52) U.S. Cl.
CPC ... *H04W 52/0235* (2013.01); *H04W 52/0219* (2013.01); *Y02B 60/50* (2013.01); *Y02D 70/00* (2018.01)

(58) Field of Classification Search
CPC .......... H04W 52/0235; H04W 52/0219; Y02D 70/00; Y02B 60/50

USPC ......................................................... 370/310
See application file for complete search history.

(56) References Cited

U.S. PATENT DOCUMENTS

| | | | |
|---|---|---|---|
| 7,308,051 B2* | 12/2007 | Boles | G06F 1/3209 375/340 |
| 7,583,985 B2 | 9/2009 | Matson et al. | |
| 8,620,394 B2 | 12/2013 | Sebastiano et al. | |
| 8,861,414 B2 | 10/2014 | Shin et al. | |
| 2012/0009926 A1* | 1/2012 | Hevizi | H04W 52/0203 455/436 |
| 2014/0086124 A1 | 3/2014 | Knowles | |
| 2014/0112229 A1* | 4/2014 | Merlin | H04W 52/0209 370/311 |
| 2015/0036576 A1 | 2/2015 | Jafarian et al. | |
| 2015/0071150 A1 | 3/2015 | Bradley | |

* cited by examiner

*Primary Examiner* — Obaidul Huq
(74) *Attorney, Agent, or Firm* — Michael Best & Friedrich LLP

(57) ABSTRACT

Systems and methods are described for a wireless electronic device including a primary wireless transceiver and a secondary wireless transceiver. An electronic processor is configured to operate the wireless device and communicate through the primary wireless transceiver when in an active mode and to monitor the secondary wireless receiver for a wake-up signal when in a sleep mode. The electronic processor transitions from the sleep mode into the active mode in response to detecting the wake-up signal through the secondary wireless receiver.

9 Claims, 10 Drawing Sheets

LOW-POWER WAKE-UP MECHANISM FOR WIRELESS DEVICES

RELATED APPLICATIONS

This application claims the benefit of U.S. Provisional Application No. 62/215,813, filed Sep. 9, 2015, and entitled "WIRELESS SYSTEM AND METHODS UTILIZING LOW COST LOW POWER WAKE-UP MECHANISM FOR ENHANCED FUNCTIONALITY," the entire contents of which are incorporated herein by reference.

BACKGROUND

The present invention relates to systems and methods for operating wireless devices with reduced power consumption requirements.

SUMMARY

Low power wireless devices, as described in various embodiments presented herein, "sleep" most of the time to conserve battery power. The devices may "wake-up" relatively infrequently to report to a system and to introduce latency when the system requires attention or action. When more frequent "wake-ups" are needed for some wireless devices (e.g., cameras, networked smoke detectors, etc.), the impact on battery life of the low power wireless device is negative.

Various embodiments of the invention provide a low-power wake-up mechanism for wireless devices that allows for reducing device response latency while significantly improving battery life. The disclosed mechanism creates support for additional use cases not available in other wireless devices and wireless networked systems.

In some embodiments, the structure of the low-power wake-up "radio" may use receiver and transmitter concepts. In other embodiments, the mechanism may include system-on-chip (SoC) radio architecture. In some embodiments, the system-on-chip architecture may utilize radio hardware filtering, sampling circuitry, and low power analog-to-digital (A-D) channels. In other embodiments, the system-on-chip architecture may utilize radio hardware filtering, sampling circuitry, and pass-through to an output pin.

In some embodiments, the wake-up mechanism is used to notify a wireless device of a system state, to notify the wireless device of an emergency, to synchronize wireless devices (e.g., smoke alarms), or some combination thereof. In other embodiments, the mechanisms is used as a "wake-up" radio for device triangulation during installation or for triangulation of a moving device (e.g., traffic or asset monitoring). In other embodiments, the mechanism may function as an intelligent system using the wake-up mechanism to confirm an alarm or to utilize pattern recognition to selectively wake up and change state or trigger devices and functions. In other embodiments, the mechanism may use a wake-up hub, redundant wake-up hubs, redundant hubs embedded in powered devices, or some combination thereof. In other embodiments, the mechanism may us wake-up signal modulation to reduce false wake-up (e.g., multiple-timed pulses), to make wake-up addressable (e.g., number, frequency, or timing of pulses), or some combination thereof.

In one embodiment, the invention provides a wireless electronic device including a primary wireless transceiver and a secondary wireless transceiver. An electronic processor is configured to operate the wireless device and communicate through the primary wireless transceiver when in an active mode and to monitor the secondary wireless receiver for a wake-up signal when in a sleep mode. The electronic processor transitions from the sleep mode into the active mode in response to detecting the wake-up signal through the secondary wireless receiver.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
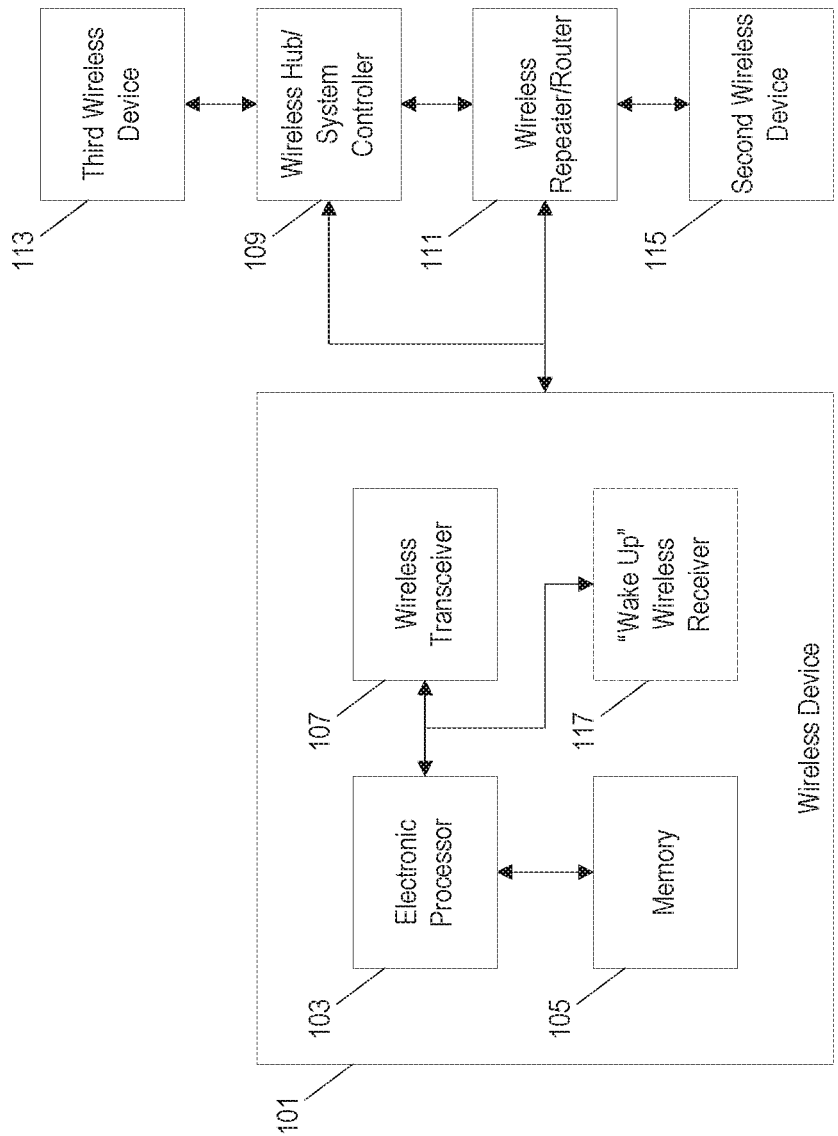
FIG. 1 is a block diagram of a wireless network system including a wireless device with a low-power wake-up mechanism according to one embodiment.

FIG. 1 illustrates an example of a wireless network. A first wireless device 101—such as, for example, a wireless smoke detector, a camera, a motion sensor, or a key panel for a building/area security system—includes an electronic processor 103 and a non-transitory computer-readable memory 105. The memory 105 is communicatively coupled to the electronic processor 103 and stores instructions that are executed by the electronic processor 103 to provide the functionality such as described herein. As discussed in further detail below, some wireless devices include multiple different electronic processors and others include sub-system modules/components that may include their own dedicated electronic processor.

The first wireless device 101 also includes a wireless transceiver 107 for two-way communication with a wireless hub or system controller 109. In some implementations and configurations, the first wireless device 101 communicates directly with the wireless hub or system controller 109 while, in other implementations and configurations, the first wireless device 101 communicates with the wireless hub or system controller 109 through a wireless repeater/router 111. Similarly, the wireless hub or system controller 109 communicates with other wireless devices in the system. In the example of FIG. 1, the wireless hub or system controller 109 communicates with a second wireless device 115 through the wireless repeater/router 111 and communicates directly with a third wireless device 113. As described in further detail below, whether the wireless hub or system controller 109 communicates directly with an individual wireless device or through a wireless repeater/router 111 may, in some embodiments, be determined based on the wireless network topology and the locations of the wireless devices relative to the wireless hub or system controller 109.

The example of FIG. 1 refers to communication with a wireless hub or system controller 109. In some implementations, as discussed in various examples presented herein, the wireless network includes an on-site system controller that receives data from the various wireless devices and generates control signals to the wireless devices—including, for example, the "wake-up" signals discussed herein. However, in other implementations, the wireless hub 109 provides for communication with a remote computer system such as a computer server or a portable wireless device (e.g., a smart phone or tablet computer).

The first wireless device 101 is configured to operate in an active mode, in which full device functionality is implemented, and in a low-power or "sleep" mode in which device functionality is limited or disabled to conserve electrical power. To transition from the low-power/"sleep" mode into the active mode, the first wireless device 101 receives a wake-up signal from the wireless hub or system controller 109.

Figure 2:
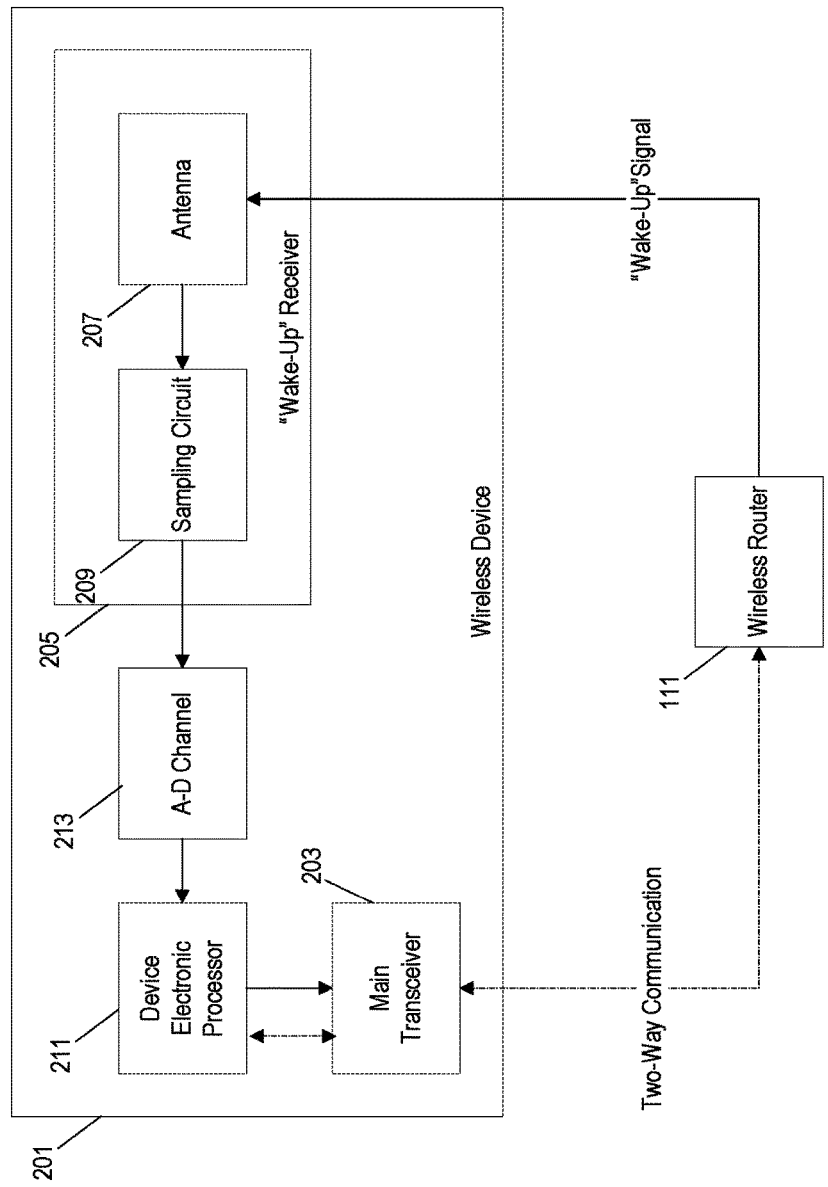
FIG. 2 is a block diagram of a wireless device including a dedicated "wake-up" receiver/radio for use in the wireless network of FIG. 1.

FIG. 2 illustrates a first example of a radio configuration in a wireless device 201 for receiving and responding to a "wake-up" signal received from a wireless router 111. In the example of FIG. 2, the wireless device 201 includes a main radio transceiver 203 and a low-power "wake-up" receiver 205. The "wake-up" receiver 205 includes an antenna 207 and a sampling circuit 209. The "wake-up" receiver 205 is coupled to a device electronic processor 211 through an A-D channel 213.

When operating in the low-power/"sleep" mode, the main transceiver 203 and the device electronic processor 211 are both either disabled or operating in a reduced-power state limiting or preventing the wireless device 201 from providing its full functionality. The "wake-up" receiver 205 implements a simplified radio circuitry that requires low-power consumption than the main transceiver 203 and, when operating in the low-power/"sleep" mode, the "wake-up" receiver 205 monitors for a "wake-up" signal from the wireless router 111. The "wake-up" signal is received by the antenna 207 of the "wake-up" receiver 205, is processed by the sampling circuit 209, and is provided to the device electronic processor 211 through the A-D channel 213. The wake-up signal causes the device electronic processor 211 to "wake-up"—that is, to transition from the low-power state to its full functionality state. In turn, the device electronic processor 211 generates a signal to activate the main transceiver 203. Once activated, the wireless device 201 is capable of its full functional operation including two-way communication with the wireless router 111.

Figure 3:
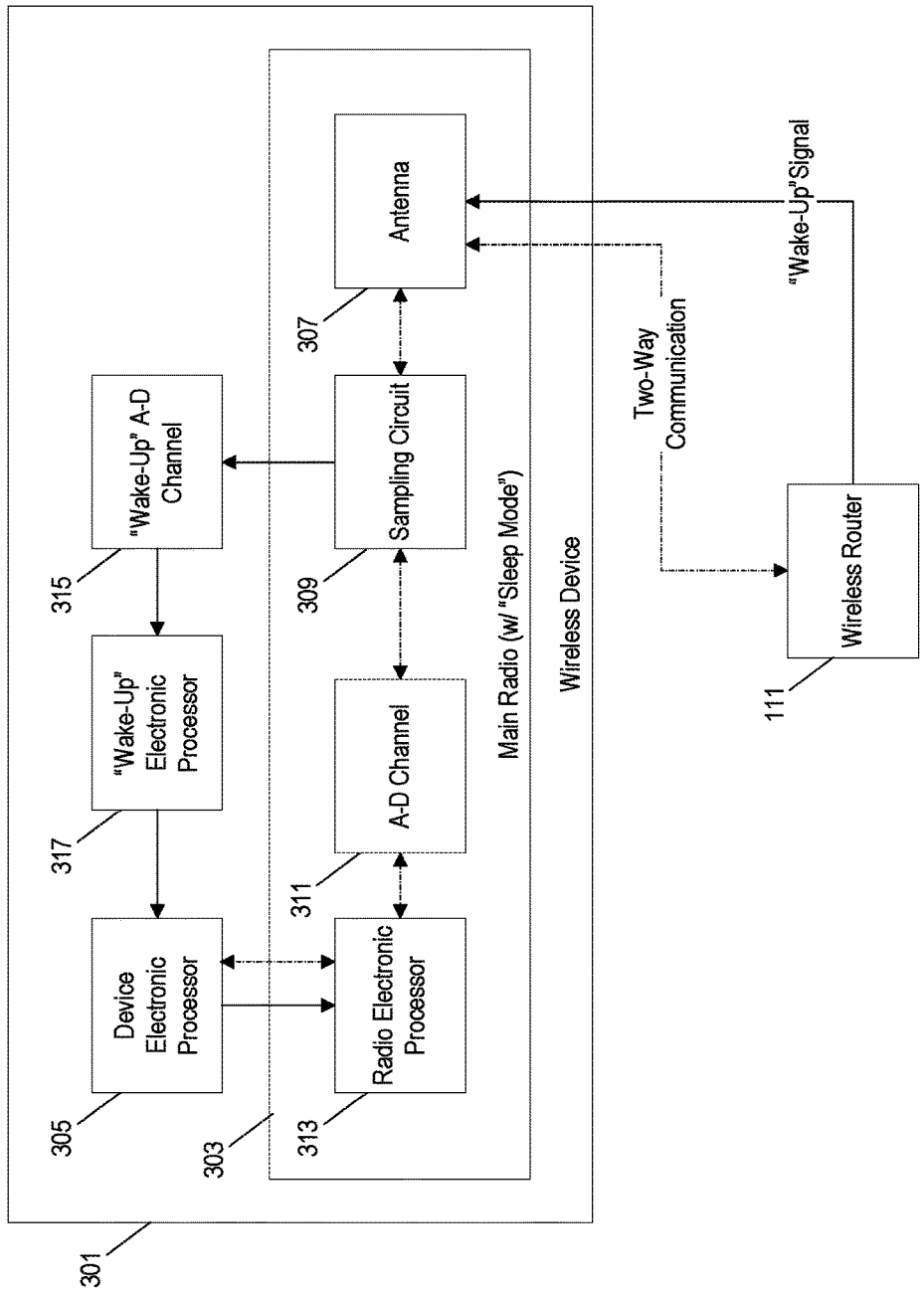
FIG. 3 is a block diagram of a wireless device configured to partially utilize the front end of the main device transceiver/radio for receiving the "wake-up" signal for use in the wireless network of FIG. 1.

In the example of FIG. 2, the wireless device 201 includes an entire dedicated "wake-up" receiver 205 for receiving the "wake-up" signal. However, in other implementations, certain front-end components of the main radio may be utilized to eliminate the expense, size, and power consumption of potentially redundant device components. For example, FIG. 3 illustrates a wireless device 301 that includes a main radio 303 coupled to the device electronic processor 305, but that does not include a separate dedicated "wake-up" receiver. The main radio 303 includes an antenna 307, a sampling circuit 309, an A-D channel 311, and its own radio electronic processor 313.

During normal operation, the main radio 303 provides from communication between the device electronic processor 305 and the wireless router 111. However, during "sleep" mode, the radio electronic processor 313 and the A-D channel 311 of the main radio 303 are disabled or operate in a reduced power state that limits or prevents full functionality of the wireless device 301. Instead of providing an entire dedicated "wake-up" radio, the wireless device 301 of FIG. 3 includes a "wake-up" electronic processor 317 that is coupled to the sampling circuit 309 of the main radio 301 through a dedicated "wake-up" A-D channel 315. When operating in the "sleep" mode, a "wake-up" signal transmitted by the wireless router 111 is received by the antenna 307 of the main radio 303, passes through the sampling circuity 309, and is directed through the "wake-up" A-D channel 315 to the "wake-up" electronic processor 317. In response, the "wake-up" electronic processor 317 generates a signal to the device electronic processor 305 causing the device electronic processor 305 to exit the "sleep" mode. In turn, the device electronic processor 305 transmits a signal "waking up" the radio electronic processor 313 of the main radio 303. The wireless device 301 is then capable of full functionality and two-way communication using the main radio 301.

The example of FIG. 3 includes a dedicated electronic processor 317 that monitors the "wake-up" A-D channel 315 for the wake-up signal and initiates the "wake-up" routine in response. However, in other implementations, the "wake-up" signal transmitted through the "wake-up" A-D channel 315 is provided directly to the device electronic processor 305 to trigger the wake-up routine. In still other embodiments, the entire main radio 305 may be configured to operate in a low-power mode so that no additional circuitry or components are necessary to implement the "wake-up" mechanism.

Figure 4:
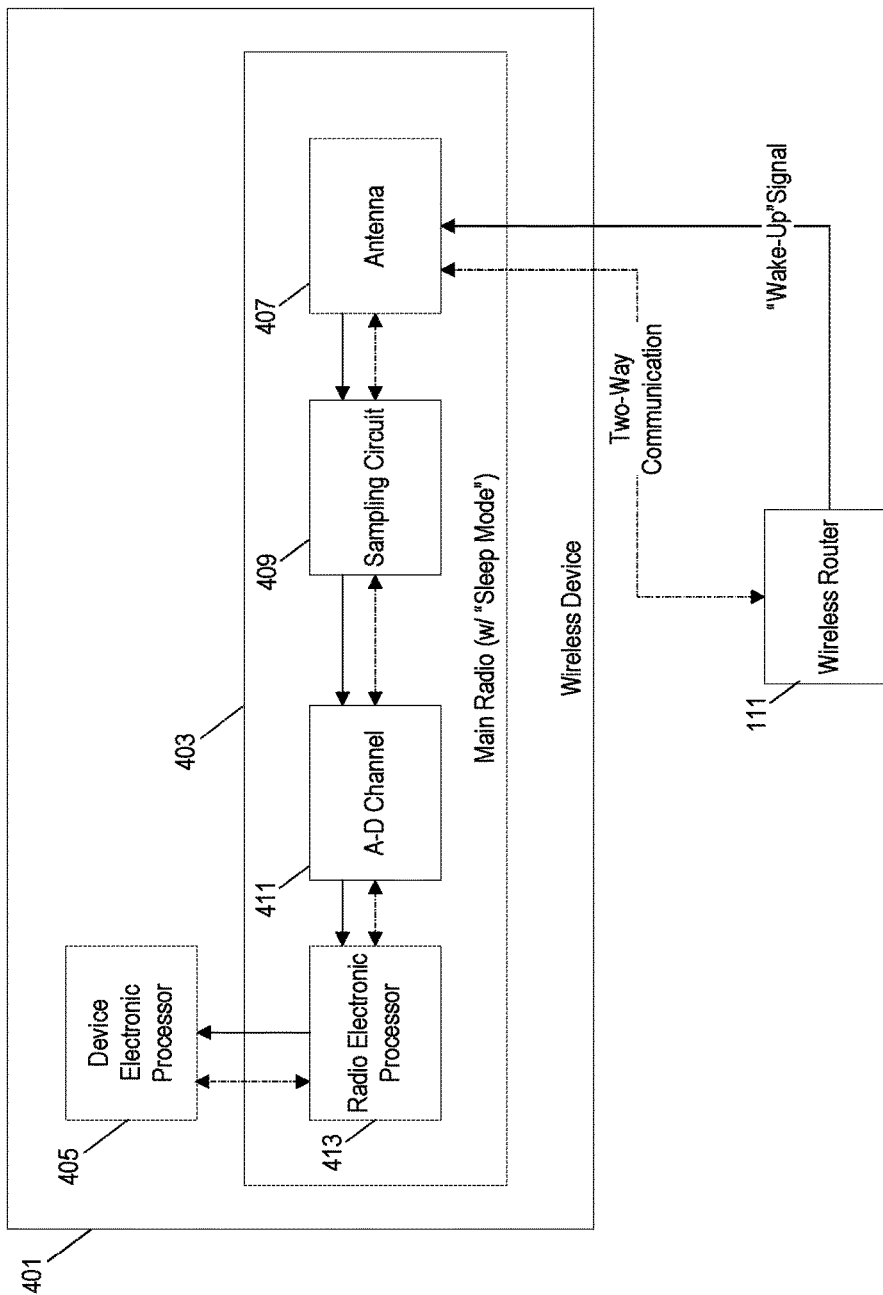
FIG. 4 is a block diagram of a wireless device without a separate "wake-up" processing circuity and configured to operate the main device radio in a "low-power" mode for use in the wireless network of FIG. 1.

FIG. 4 illustrates an example of one such wireless device 401. The wireless device 401 includes a main radio 403 and a device electronic processor 405. The main radio 403 includes an antenna 407, a sampling circuit 409, an A-D channel 411, and a radio electronic processor 413. The main radio 403 in this example is configured to operate in a low-power mode in which the main radio 403 is not capable of fully functional two-way communication with the wireless router 111, but instead is capable of simplified periodic monitoring for a specific "wake-up" signal (such as, for example, described in further detail below). In the example of FIG. 4, the main radio 403 receives the wake up signal and, in response, the radio electronic processor 413 and the device electronic processor 405 are both brought out of their "sleep" mode operation. Similarly, in some implementations, the A-D channel 411 and the sampling circuity 409 have lower power requirements when the main radio 403 is operating in the "sleep" mode. Therefore, in response to detecting the "wake-up" signal, the radio electronic processor 413 causes full power to be restored to the A-D channel 411 and the sampling circuity 409.

To further illustrate operation of the wireless devices, such as those illustrated in FIGS. 2 through 4, FIG. 5 illustrates an example of a wireless network system installed in a usage area 501—for example, a premises covered by a security or building automation system. In this example, the usage area 501 includes a basement area 503 and a $2^{nd}$ floor area 505. A wireless hub 507 is positioned in the basement 507 and is in communication with a remote system/controller 509. A first wireless device 511 and a second wireless device 513 are also positioned in the basement 503. A wireless router/repeater 515 is positioned in the $2^{nd}$ floor area 505. The wireless router/repeater 515 receives signals from the wireless hub 507 (including, for example, a "wake-up" signal) and re-transmits the signal to wireless devices located in the $2^{nd}$ floor area 505—including a third wireless device 517 and a fourth wireless device 519.

Figure 5:
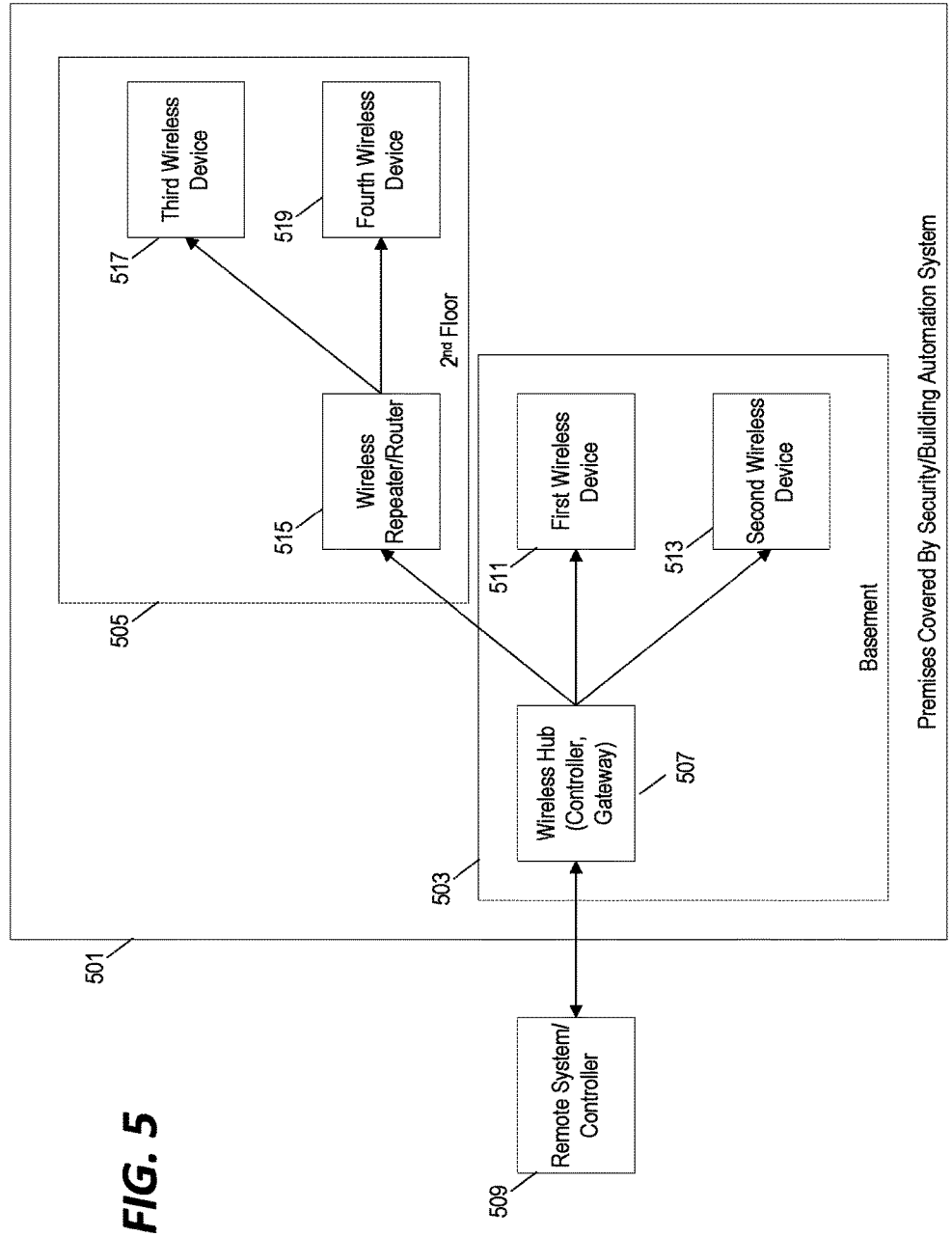
FIG. 5 is a schematic diagram of a wireless network, such as illustrated in FIG. 1, installed in a usage area and including a wireless router to transmit a "wake-up" signal to wireless devices in remote locations of the usage area.

In the example of FIG. 5, a "wake-up" signal may be initiated by the remote system/controller 509 and transmitted by the wireless hub 507. The "wake-up" signal is received directly from the wireless hub 507 by the first wireless device 511 and the second wireless device 513. The wireless router/repeater 515 receives the "wake-up" signal and re-transmits it to the third wireless device 517 and the further wireless device 519. Using this configuration, "wake-up" signal can be transmitted to a detected by all of the wireless devices operating in the usage area 501.

Figure 6:
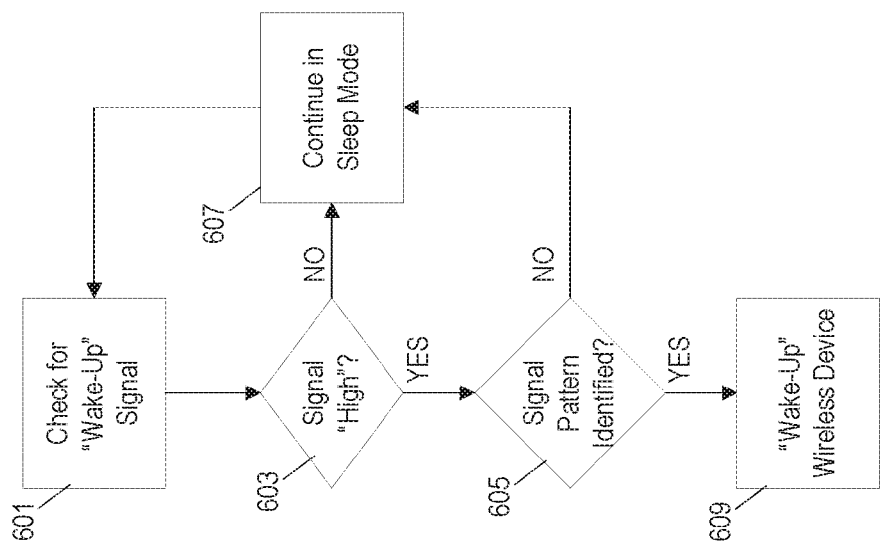
FIG. 6 is a flowchart of a method implemented by the wireless device for receiving a wake-up signal in the system of FIG. 1 and triggering a "wake-up" routine.

When a wireless device receives a "wake-up" signal, it must process and detect that signal before initiating a "wake-up" routine of the wireless device. FIG. 6 illustrates an example of one method for processing a received signal to determine whether to initiate a "wake-up" routine. The wireless device periodically checks the signal from the antenna for the "wake-up" signal (block 601). In some implementations (as described below in reference to FIG. 7), the "wake-up" signal is provided as a pulse modulated "high/low" signal. In such implementations, the wireless device determines whether a "high" signal is detected on the antenna (block 603) and whether a signal pattern has been detected (block 605). If not, the wireless device continues to operate in "sleep" mode (block 607). However, once the signal pattern of the "wake-up" signal has been identified, the wireless device initiates a routine to "wake-up" the wireless device (block 609).

Figure 7:
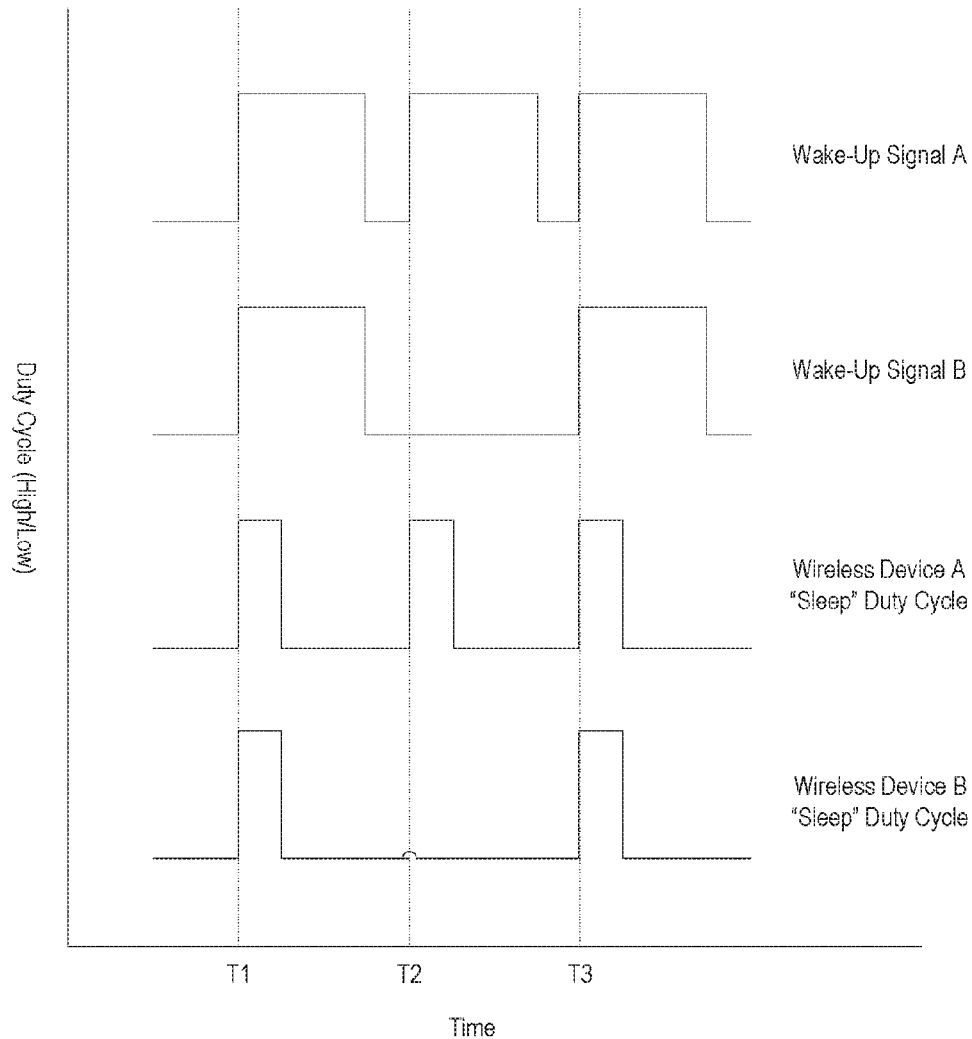
FIG. 7 is a graph illustrating different examples of "wake-up" signals that are received by the wireless devices and signal monitoring duty-cycles for wireless devices in the system of FIG. 1.

FIG. 7 illustrates one example of a communication and signal generation/detection scheme for low-power operation of the wireless devices. A wireless device implementing the method of FIG. 6 may implement a "duty cycle" in which it periodically checks the antenna for a "high" signal. Two examples of such periodic duty cycles are illustrated as "Wireless Device A 'Sleep' Duty Cycle" and "Wireless Device B 'Sleep" Duty Cycle" in FIG. 7. A "wake-up" signal may be generated with the same periodic frequency—two examples are shown in FIG. 7 as "Wake-Up Signal A" and "Wake-Up Signal B."

The duration of the "high" signal in the example of FIG. 7 is longer than the active duration of the monitoring duty cycle. In this way, the wireless device is more likely to detect a "high" signal portion of the wake-up signal when it checks the antenna even if the source of the wake-up signal is not precisely synchronized with the duty cycle of the wireless device. However, in other implementations, the duty cycle and the duration of the wake-up signal are reversed such that the wireless device monitors the antenna for a longer duration and is configured to detect a single "high" signal amplitude during each period.

A wireless device implementing the monitoring duty cycle illustrated as "Wireless Device A Sleep Duty Cycle" in FIG. 7 may be configured to detect the "Wake-Up Signal A"—that is, a series of three sequential "high" signals. When the wireless device checks the antenna for a "high" signal at T1, T2, and T3 while the "Wake-Up Signal A" is being broadcast, the wireless device detects the "high" signal at each period and responds by initiating the "wake-up" routine. However, a wireless device implementing the monitoring duty cycle of "Wireless Device A Sleep Duty Cycle" and configured to detect "Wake-Up Signal A" would not respond to "Wake-Up Signal B." Upon checking the antenna at T2, the wireless device would detect no "high" signal and would remain in its "sleep" mode.

However, in some implementations, one or more wireless devices may be configured to implement the monitoring duty cycle shown in FIG. 7 as "Wireless Device B Sleep Duty Cycle" and to detect "Wake-Up Signal B." Wireless Device B would initiate the wake-up routine in response to either "Wake-Up Signal A" or "Wake-Up Signal B," because when Wireless Device B checks the signal on the antenna at T1 and T3, it detects a "high" signal regardless of whether "Wake-Up Signal A" or "Wake-Up Signal B" is being transmitted.

This type of frequency adjusted duty cycle enables wireless network systems to be designed to selectively activate all wireless devices or only a subset of wireless devices. Referring again to the example of FIG. 5, two different wireless devices may be positioned in each room within the usage area 501. For example, the first wireless device 511 and the third wireless device 517 may include smoke detectors while the second wireless device 513 and the fourth wireless device 519 include cameras. The first and third wireless devices 511, 517 may be configured to operate on the "Wireless Device B Sleep Duty Cycle" while the second and further wireless devices 513, 519 are configured to operate on the "Wireless Device A Sleep Duty Cycle." To selectively activate the smoke detectors without activating the cameras, the wireless hub 507 would broadcast "Wake-Up Signal B," which would trigger the wireless devices operating on the "Wireless Device B Sleep Duty Cycle," but would not trigger the wireless devices operating on the "Wireless Device A Sleep Duty Cycle." Conversely, to activate both the smoke detectors and the cameras, the wireless hub 507 would broadcast "Wake-Up Signal A," which, as discussed above, would trigger both wireless devices operating on the "Wireless Device A Sleep Duty Cycle" and the "Wireless Device B Sleep Duty Cycle."

To provide even further specificity and selectivity, wireless devices in some implementations may be configured to detect signal patterns with both high and low components. For example, a wireless device may be configured to operate on the "Wireless Device A Sleep Duty Cycle" and to initiate its "wake-up" routine only upon detecting the "Wake-Up Signal B."—that is, a high signal at T1, a low signal at T2, and a high signal at T3. With this functionality, in some implementations, three different groups of wireless devices may be configured such that the first group (e.g., the cameras) is activated only when "Wake-Up Signal A" is broadcast, the second group (e.g., the smoke detectors) is activated when either "Wake-Up Signal A" or "Wake-Up Signal B" is broadcast, and the third group (e.g., system keypanels) is activated only when "Wake-Up Signal B" is broadcast.

Figure 8:
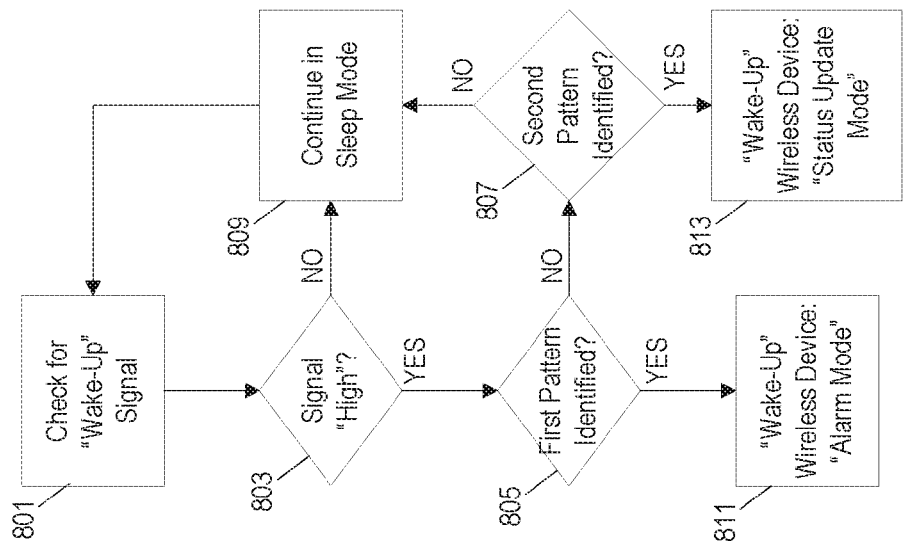
FIG. 8 is a flowchart of a method implemented by the wireless device for receiving and distinguishing between multiple different "wake-up" signals in the system of FIG. 1.

Furthermore, in some implementations, the wireless device may be configured to detect both "Wake-Up Signal A" and "Wake-Up Signal B" and to respond differently based on the specific signal that is identified. FIG. 8 illustrates on example of a method by which a wireless device may operate differently based on the specific type of "wake-up" signal that is detected. The wireless device periodically monitors the antenna for the wake-up signal (block 801). The wireless device determines whether the signal is high (block 803), whether a first signal pattern has been detected (block 805), and whether a second signal pattern has been detected (block 807). If neither signal pattern has been detected, then the wireless device continues to operate in its "sleep" mode (block 809). However, if the first signal pattern has been identified (block 805), the wireless device initiates a wake-up routine in an "Alarm" mode (block 811). Furthermore, if the second signal pattern has been identified (block 807), then the wireless device initiates a wake-up routine in a "Status Update Mode" (block 813).

In some implementations, the specific type of "wake-up" signal that is detected will dictate which routines are performed by the wireless device first during the "wake-up" routine. In other implementations, the type of "wake-up" signal will dictate what functionality of the wireless device is made available and for how long. For example, in some implementations, waking up in "alarm" mode causes the wireless device to operate with full functionality until "sleep" mode is initiated again. However, waking up in "status updated" mode may cause the wireless device to activate itself only temporarily so that a status update message can be generated and sent back to the wireless hub before the wireless device again enters the sleep mode. In other implementations, the "wake-up" signal can be further differentiated and identified based on other characteristics including, for example, pulse width or amplitude.

Figure 9:
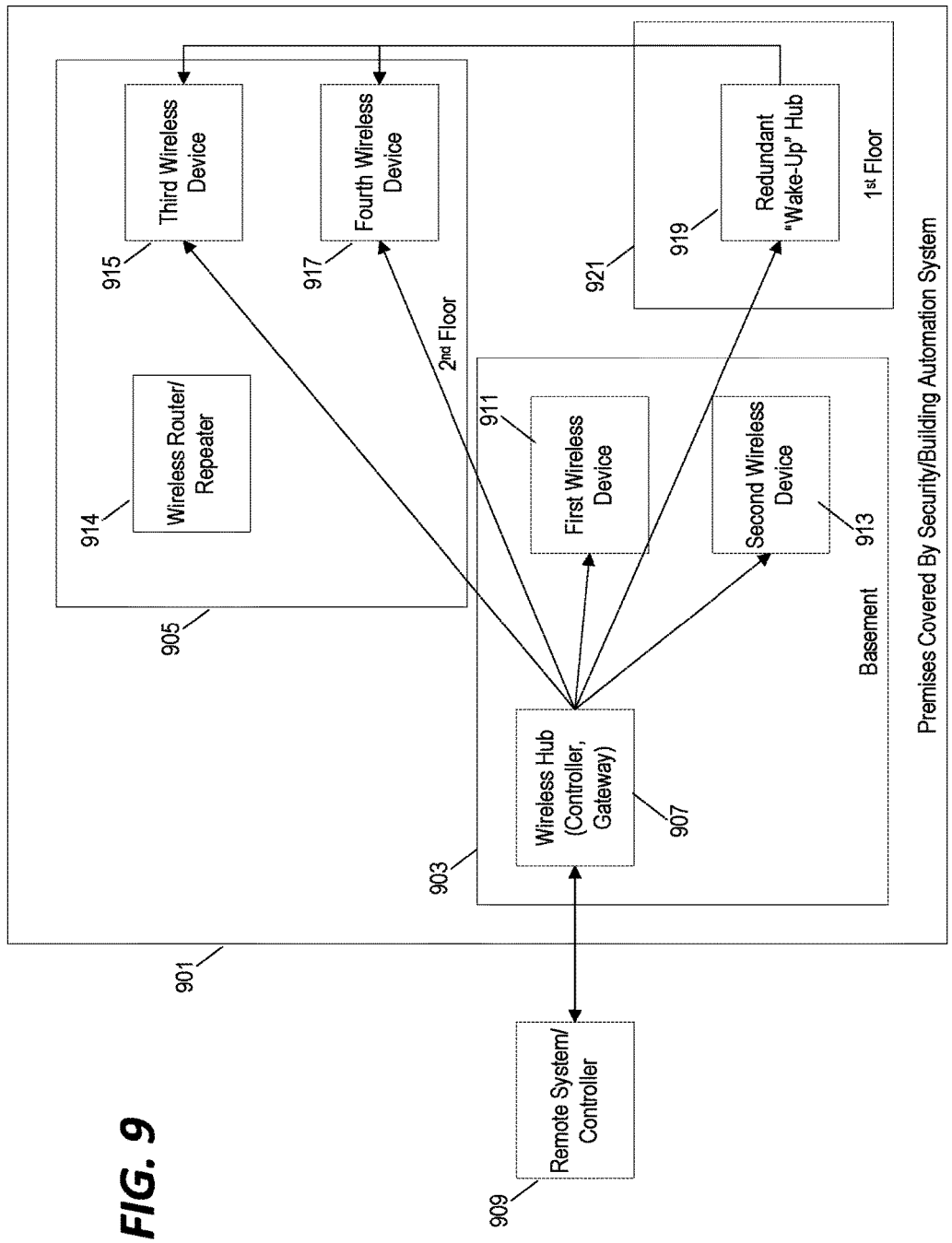
FIG. 9 is a schematic diagram of a wireless network, such as illustrated in FIG. 1, installed in a usage area and including a redundant wake-up hub for ensuring that all wireless devices receive and respond to a generated "wake-up" signal.

In the example configuration illustrated in FIG. 5, a router/repeater is used to relay a wake-up signal from a wireless hub to other remotely located wireless devices. However, some implementations, the wireless network is further configured to ensure that the wake-up signal is received by the wireless devices in the event that the router/repeater or other wireless hub is disabled, destroyed, or blocked. FIG. 9 illustrates one such example. Like in the example of FIG. 5, a wireless hub 907 is located in a basement 903 of a usage area 901 and is capable of transmitting a wake-up signal to a first wireless device 911 and a second wireless device 913 also located in the basement 903. A wireless router/repeater 914 is located on the second floor 905 and is configured to receive signals from the wireless hub 907 and to rebroadcast the signals to the third wireless device 915 and the fourth wireless device 917 also located on the second floor 905.

In the event that the wireless router/repeater 914 on the second floor 905 is temporarily or permanently destroyed, blocked, or disabled. The main radio of the wireless hub 907 may have sufficient range to reach the third wireless device 915 and the fourth wireless device 917 located on a second floor 905 of the usage area 901, but, due to factors such as regulatory power restrictions and limited receiver sensitivity, the signal generated by the wireless hub 907 might not be detected by the wireless devices 915, 917 on the second floor 905. Therefore, a redundant wake-up hub 919 is positioned at a location within range of both the wireless hub 907 and the wireless devices 9015, 917 on the second floor 905 (e.g., at a location on the first floor 921). The redundant "wake-up" hub 919 is connected to the wireless hub 907 via a main local radio link and is implemented to redundantly transmit the wake-up signal to devices located within range of the wireless repeater/router 914 (e.g., the third wireless device 915 and the fourth wireless device 917).

Figure 10:
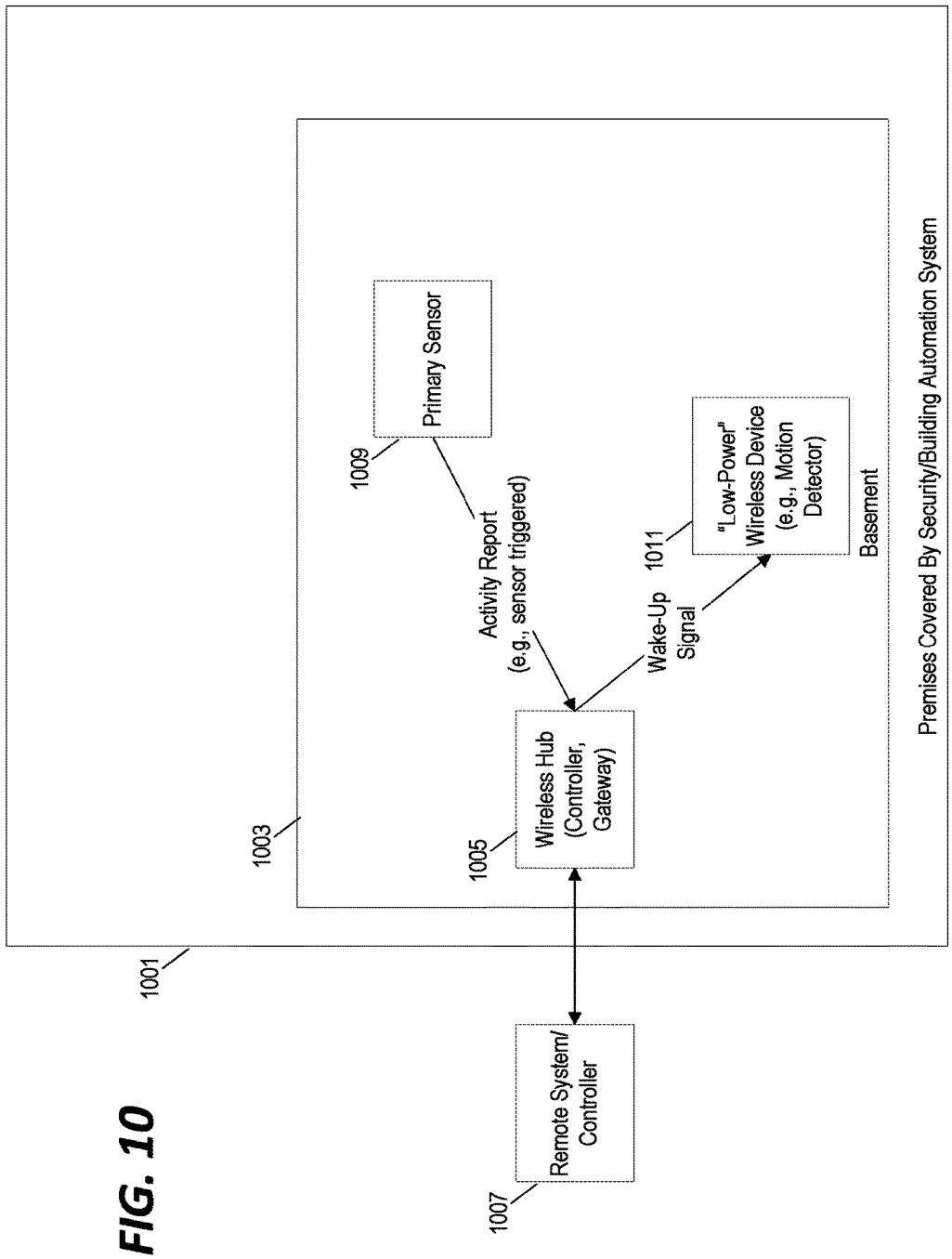
FIG. 10 is a schematic diagram of a wireless network, such as illustrated in FIG. 1, configured to "wake-up" a low-power device in response to a triggering of an active sensor.

In the examples described above, the "wake-up" signal is generated/transmitted by a wireless hub or controller. In some implementations, the transmission of this "wake-up" signal is initiated by a (local or remote) system controller or by a remote device (e.g., a smart phone, tablet computer, etc.). However, in other implementations, the "wake-up" signal is initiated in response to an activity or event detected by an active sensor coupled to the system. FIG. 10 illustrates an example of one such system. In the example of FIG. 10, the wireless system is installed in a usage area 1001 that includes a basement 1003. A wireless hub 1005 is positioned within the basement 1003 and is coupled to a remote system/controller 1007. A primary sensor 1009 and another "low-power" wireless device 1011 are also positioned in the basement 1003. In response to an event that triggers the primary sensor 1009, the primary sensor 1009 transmits an activity report signal to the wireless hub 1005 which, in turn, transmits a wake-up signal that causes the wireless device 1011 to activate itself.

In this example, the primary sensor 1009 is an active security sensor such as a door sensor, a pressure sensor, or a motion sensor and the additional wireless device 1011 includes a more sensitive/accurate motion detector. The primary sensor 1009 is configured to make a preliminary determination of whether a security breach has occurred (e.g., an unauthorized door has been opened). To confirm the security breach, the primary sensor 1009 causes the "wake-up" signal to be send to the wireless device 1011 which activates a motion sensor that can verify whether there is movement within the basement indicative of an unauthorized person.

Figure 11:
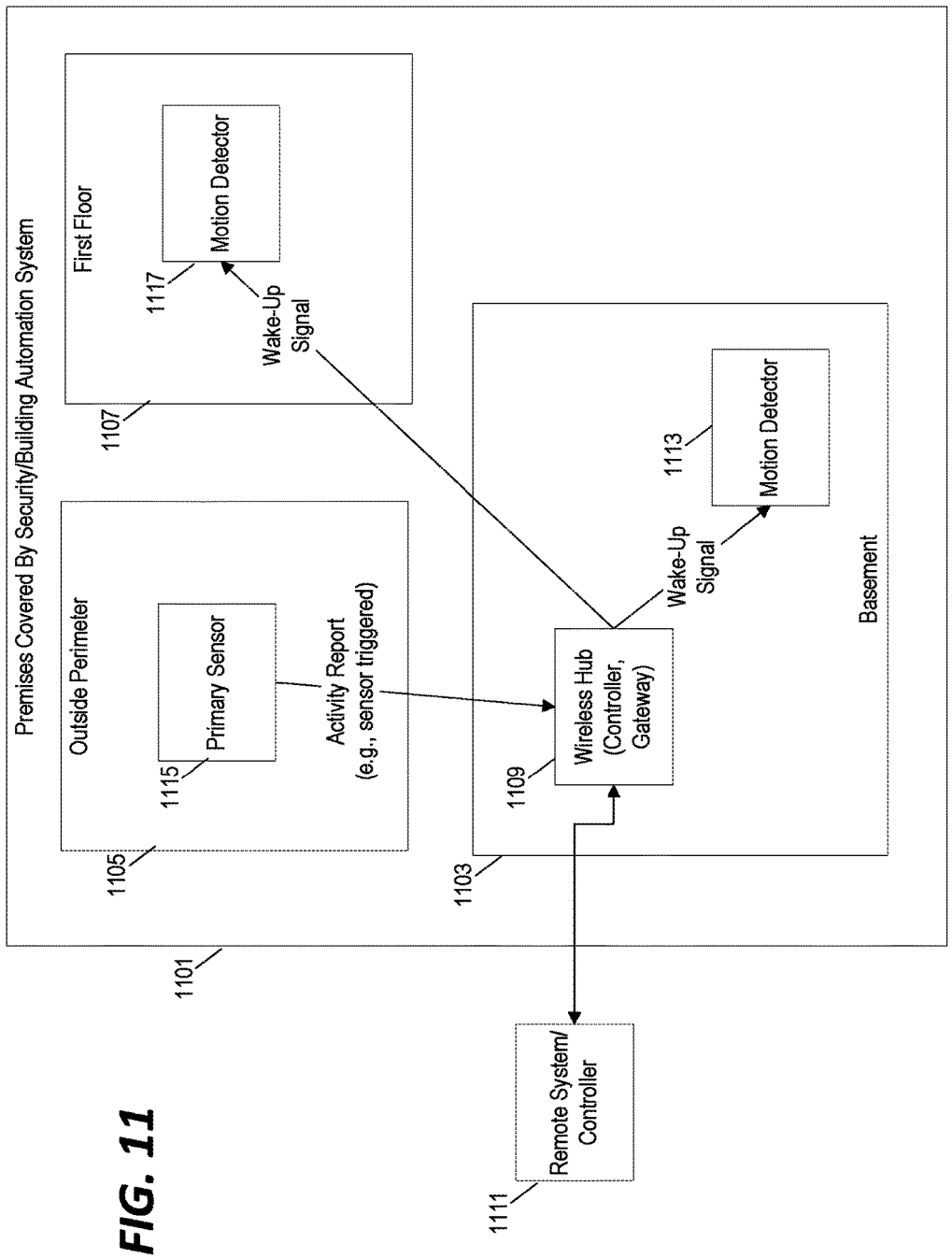
FIG. 11 is a schematic diagram of a wireless network, such as illustrated in FIG. 1, configured to "wake-up" multiple low-power devices in other locations of a usage area in response to a triggering of an active sensor.

This functionality can be further extended to usage areas that include wireless security system devices in multiple rooms. FIG. 11 illustrates an example of a usage area 1101 that includes a basement 1103, an outside perimeter 1105, and a first floor 1107. A wireless hub 1109 is positioned in the basement 1103 and is in communication with a remote system/controller 1111. A first motion detector 1113 is also positioned in the basement 1103, a second motion sensor 1115 is positioned along the outside perimeter 1105, and a third motion detector 1117 is positioned in the first floor area 1107. When the security system is activated for the night, the second motion sensor 1115 in the outside perimeter area 1105 is activated and operates as the primary sensor for the system while the first motion detector 1113 and the third motion detector 1117 are placed in a low-power "sleep" mode. In response to detecting movement in the outside perimeter area 1105, the second motion detector 1115 sends an activity report signal to the wireless hub 1109 which, in turn, transmits a wake-up signal to both the first motion detector 1113 and the third motion detector 1117. As a result, the system is able to reduce power consumption by placing the first motion detector 1113 and the third motion detector 1117 in sleep mode during normal night-time operation. However, when the remaining active sensor detects movement, the full functionality of the security system is enabled.

As discussed above in reference to FIG. 8, the wireless devices can be configured to respond differently to different types of "wake-up" signals. This can be applied to the security system in the example of FIG. 11 by generating different "wake-up" signals that initiate different "system alert levels" based on the nature of the activity that is detected.

In other implementations, the mechanism by which the output from one active sensor triggers the "waking up" of another wireless device can be used for other functionality including, for example, the tracking and triangulation of objects. For example, multiple transmitters, each broadcasting a different low-power "wake-up" signal, can be placed at different locations around a usage area such as a retail store. The signals transmitted by each transmitter can be differentiated by the wireless device based on the time, pulse width, frequency, or pattern of the transmitted signals. The wireless device "wakes up" in response to detecting at least one of these broadcasted signals (or in response to another sensor output, such as, for example, a motion sensor attached to a shopping cart) and measures the relative signal level (e.g., strength) of each of the different signals. The system uses this information to triangulate the location of the wireless device.

This triangulation can be used to monitor the movement of movable objects (e.g., a shopping cart) in order to detect and mitigate traffic/congestion, provide shopper assistance (e.g., designing an optimized route for collecting items from a shopping list based on detected shopper congestion), and monitor assets. In other implementations, triangulation can be used to monitor stationary devices during installation to facilitate automatic generation of installation maps, which can save significant time for installers.

Finally, triangulation can be used to detect and locate the source of radio interference and "jamming." Wireless devices can be configured to wake up and report the signal level/strength of transmissions that were not sent by the system. Based on this information, the system may use intelligent decision making to either ignore such events (if infrequent and scattered) or report interference/jamming for further investigation mitigation. An approximate location of the interference/jamming source can be derived from the triangulation information and, in cases where the source of the interference cannot be removed, this information can be used to adjust wake-up sensitivities of select devices, change wake-up transmission patterns, and even disable the wake-up mechanism on some devices either permanently or for the duration of the interference.

Thus, the invention provides, among other things, a wireless device with a low-power mechanism for monitoring for a "wake-up" signal and wireless network systems for implementing and transmitting "wake-up" signals. Various features and advantages of the invention are set forth in the following claims.

What is claimed is:

1. A wireless communications system comprising:
   a first wireless device comprising
      a primary wireless transceiver;
      a secondary wireless receiver; and
      an electronic processor configured to
         operate the first wireless device and communicate through the primary wireless transceiver when in an active mode,
         monitor the secondary wireless receiver for a wake-up signal when the first wireless device is in a sleep mode, and
         transition the first wireless device from the sleep mode to the active mode in response to detecting the wake-up signal through the secondary wireless receiver, and
   a second wireless device, wherein
      the first wireless electronic device is configured to monitor the secondary wireless receiver for the wake-up signal by monitoring an antenna for a binary high signal at a defined number of intervals according to a first duty cycle, and
      wherein the second wireless electronic device is configured to monitor a wireless receiver for a second wake-up signal by monitoring an antenna of the second wireless electronic device for a binary high signal at a second defined number of intervals according to a second duty cycle, the second duty cycle being different from the first duty cycle.

2. The wireless communications system of claim 1, wherein the secondary wireless receiver includes a dedicated wireless radio device that is separate from components of the primary wireless transceiver.

3. The wireless communications system of claim 1, wherein the primary wireless transceiver includes a primary antenna, a sampling circuit, and a primary radio electronic processor, and
   wherein the secondary wireless receiver includes the antenna and a second radio electronic processor.

4. The wireless communications system of claim 3, wherein the primary radio electronic processor operates in a reduced power mode when the first wireless electronic device is in the sleep mode.

5. The wireless communications system of claim 1, wherein the electronic processor is configured to disable communication through the primary wireless transceiver when in the sleep mode.

6. The wireless communications system of claim 5, wherein the electronic processor is configured to disable communication through the secondary wireless receiver when in the active mode.

7. The wireless communications system of claim 1, further comprising a wireless signal source configured to
   transition both the wireless electronic device and the second wireless electronic device from the sleep mode into the active mode by transmitting a first wake-up signal configured to provide a binary high signal according to both the first duty cycle and the second duty cycle, and
   transition the wireless electronic device, and not the second wireless electronic device, from the sleep mode into the active mode by transmitting a second wake-up signal configured to provide a binary high signal according to the first duty cycle and not according to the second duty cycle.

8. The wireless communications system of claim 1, further comprising:
   a wireless signal source configured to transmit the wake-up signal; and
   a redundant wireless signal source configured to detect the wake-up signal transmitted by the wireless signal source and to re-transmit the wake-up signal to the second wireless electronic device, wherein the redundant wireless signal source is positioned between the wireless signal source and the second wireless electronic device.

9. The wireless communications system of claim 1, wherein the second wireless electronic device is further configured to detect a trigger event and, in response to the trigger event, transmit a trigger signal to a wireless signal source, and further comprising a wireless signal source configured to transmit the wake-up signal to the first wireless electronic device in response to receiving the trigger signal from the second wireless electronic device.

* * * * *